United States Patent
Voicu

(10) Patent No.: US 11,983,379 B2
(45) Date of Patent: *May 14, 2024

(54) MULTI-ANCHOR BASED EXTRACTION, RECOGNITION, AND MACHINE LEARNING OF USER INTERFACE (UI)

(71) Applicant: UiPath, Inc., New York, NY (US)

(72) Inventor: Cosmin Voicu, Bucharest (RO)

(73) Assignee: UIPATH, INC., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/977,771

(22) Filed: Oct. 31, 2022

(65) Prior Publication Data

US 2023/0051443 A1 Feb. 16, 2023

Related U.S. Application Data

(63) Continuation of application No. 17/187,166, filed on Feb. 26, 2021, now Pat. No. 11,487,563, which is a continuation of application No. 16/516,998, filed on Jul. 19, 2019, now Pat. No. 10,936,351.

(51) Int. Cl.
| | |
|---|---|
| *G06F 9/455* | (2018.01) |
| *G06F 3/0481* | (2022.01) |
| *G06K 9/34* | (2006.01) |
| *G06N 20/00* | (2019.01) |
| *G06V 30/148* | (2022.01) |
| *G06V 30/10* | (2022.01) |

(52) U.S. Cl.
CPC ........ *G06F 3/0481* (2013.01); *G06F 9/45512* (2013.01); *G06N 20/00* (2019.01); *G06V 30/153* (2022.01); *G06V 30/10* (2022.01)

(58) Field of Classification Search
CPC .... G06F 9/45512; G06N 20/00; G06K 9/344; G06K 2209/01

See application file for complete search history.

(56) References Cited

U.S. PATENT DOCUMENTS

| | | | |
|---|---|---|---|
| 9,274,934 B2 * | 3/2016 | Chandra | ............. G06F 11/3688 |
| 10,088,969 B2 | 10/2018 | Schein et al. | |
| 10,235,192 B2 | 3/2019 | Hall et al. | |
| 10,936,351 B2 | 3/2021 | Voicu | |
| 2006/0036577 A1 * | 2/2006 | Knighton | ........... G06Q 30/0269 |
| | | | 707/E17.02 |

(Continued)

FOREIGN PATENT DOCUMENTS

| | | |
|---|---|---|
| AU | 2014277851 | 7/2016 |
| CN | 102110235 A | 6/2011 |

(Continued)

OTHER PUBLICATIONS

Notification of Patent Grant received in CN Application No. 202210305333.X, dated Sep. 14, 2023, 5 pages.

(Continued)

*Primary Examiner* — David F Dunphy
(74) *Attorney, Agent, or Firm* — VOLPE KOENIG

(57) ABSTRACT

Multiple anchors may be utilized for robotic process automation (RPA) of a user interface (UI). The multiple anchors may be utilized to determine relationships between elements in the captured image of the UI for RPA. The results of the anchoring may be utilized for training or retraining of a machine learning (ML) component.

16 Claims, 8 Drawing Sheets

(56) References Cited

U.S. PATENT DOCUMENTS

| | | |
|---|---|---|
| 2007/0172130 A1 | 7/2007 | Zuev et al. |
| 2009/0063946 A1 | 3/2009 | Balasubramanian |
| 2010/0138775 A1 | 6/2010 | Kohen et al. |
| 2014/0118239 A1 | 5/2014 | Phillips |
| 2018/0157386 A1 | 6/2018 | Su |
| 2018/0357081 A1 | 12/2018 | Kagawa et al. |
| 2019/0213754 A1 | 7/2019 | Lee et al. |

FOREIGN PATENT DOCUMENTS

| | | |
|---|---|---|
| CN | 105229707 A | 1/2016 |
| CN | 109492583 A | 3/2019 |
| CN | 110009643 A | 7/2019 |
| CN | 112241302 A | 1/2021 |
| EP | 3 343 378 | 7/2018 |
| WO | 2018/128930 | 7/2018 |

OTHER PUBLICATIONS

Feng, "Research on Target Recognition Technique Based on Gait," China's Outstanding Master's Thesis Full-text Database Information Technology Series, published Dec. 15, 2018, with abstract, pp. 1138-1095, 90 pages.

\* cited by examiner

MULTI-ANCHOR BASED EXTRACTION, RECOGNITION, AND MACHINE LEARNING OF USER INTERFACE (UI)

CROSS REFERENCE TO RELATED APPLICATION

This application is a continuation of U.S. patent application Ser. No. 17/187,166 filed Feb. 26, 2021, which is a continuation of U.S. patent application Ser. No. 16/516,998, filed Jul. 19, 2019, which issued as U.S. Pat. No. 10,936,351 on Mar. 2, 2021, all of which are incorporated by reference as if fully set forth.

BACKGROUND

Robotic process automation (RPA) may automate repetitive operations, functions, or workflows in enterprise platforms, virtual machine (VM) configurations, remote desktops, cloud computing, desktop applications, or the like. For user interface (UI) capture, extraction, scraping, or execution for automation, an anchor or reference point may be utilized with computer vision (CV) or machine vision (MV) to identify one or more elements in a target area of an image of a UI. However, configurations utilizing a single anchor or reference point may be susceptible to undesirable duplication, errors, false positives, missed elements, or the like.

In RPA design or execution of a workflow, dots per inch (DPI), sizing, scaling, video frame rates, shading, or the like based errors also may be encountered. These errors may be more pronounced in virtual or remote machine configurations. In addition, button shapes or checkboxes in a UI may cause errors for RPA using CV. It is desirable to use improved anchoring to reduce errors in workflow generation or runtime for RPA.

SUMMARY

Methods and apparatuses for utilizing multi-anchoring for a user interface (UI) for robotic process automation (RPA) of one or more workflows are disclosed. Multiple anchors analysis on a UI during development or runtime of robots, for one or more workflows for automation, may be utilized for element detection or training on extracted or scraped images. Multi-anchoring analysis may also be configured on a UI for desktop applications, web applications, and virtual or remote machine configurations to reduce errors and increase performance.

BRIEF DESCRIPTION OF THE DRAWING(S)

A more detailed understanding may be had from the following description, given by way of example in conjunction with the accompanying drawings, wherein like reference numerals in the figures indicate like elements, and wherein.

DETAILED DESCRIPTION

For the methods and processes described below the steps recited may be performed out of sequence in any order and sub-steps not explicitly described or shown may be performed. In addition, "coupled" or "operatively coupled" may mean that objects are linked but may have zero or more intermediate objects between the linked objects. Also, any combination of the disclosed features/elements may be used in one or more embodiments. When using referring to "A or B", it may include A, B, or A and B, which may be extended similarly to longer lists. When using the notation X/Y it may include X or Y. Alternatively, when using the notation X/Y it may include X and Y. X/Y notation may be extended similarly to longer lists with the same explained logic.

Figure 1A:
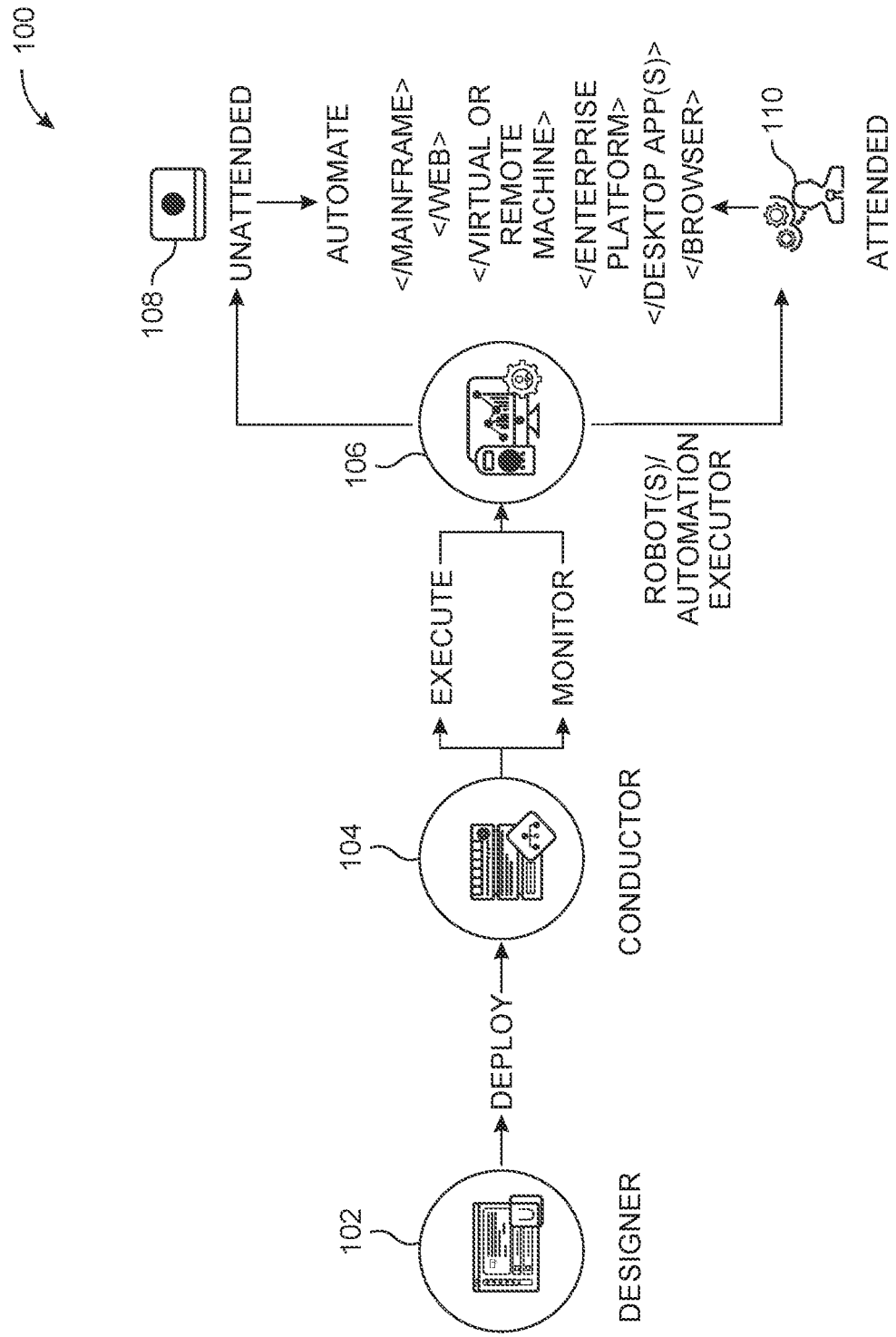
FIG. 1A is an illustration of robotic process automation (RPA) development, design, operation, or execution.

FIG. 1A is an illustration of robotic process automation (RPA) development, design, operation, or execution 100. Designer 102, sometimes referenced as a studio, development platform, development environment, or the like may be configured to generate code, instructions, commands, or the like for a robot to perform or automate one or more workflows. From a selection(s), which the computing system may provide to the robot, the robot may determine representative data of the area(s) of the visual display selected by a user or operator. As part of RPA, shapes such as squares, rectangles, circles, polygons, freeform, or the like in multiple dimensions may be utilized for UI robot development and runtime in relation to a computer vision (CV) operation or machine learning (ML) model.

Non-limiting examples of operations that may be accomplished by a workflow may be one or more of performing login, filling a form, information technology (IT) management, or the like. To run a workflow for UI automation, a robot may need to uniquely identify specific screen elements, such as buttons, checkboxes, text fields, labels, etc., regardless of application access or application development. Examples of application access may be local, virtual, remote, cloud, Citrix®, VMWare®, VNC®, Windows® remote desktop, virtual desktop infrastructure (VDI), or the like. Examples of application development may be win32, Java, Flash, hypertext markup language ((HTML), HTML5, extensible markup language (XML), Javascript, C#, CA-F, Silverlight, or the like.

A workflow may include, but are not limited to, task sequences, flowcharts, Finite State Machines (FSMs), global exception handlers, or the like. Task sequences may be linear processes for handling linear tasks between one or more applications or windows. Flowcharts may be configured to handle complex business logic, enabling integration of decisions and connection of activities in a more diverse manner through multiple branching logic operators. FSMs may be configured for large workflows. FSMs may use a finite number of states in their execution, which may be triggered by a condition, transition, activity, or the like. Global exception handlers may be configured to determine workflow behavior when encountering an execution error, for debugging processes, or the like.

A robot may be an application, applet, script, or the like, that may automate a UI transparent to an underlying operating system (OS) or hardware. At deployment, one or more robots may be managed, controlled, or the like by a conductor 104, sometimes referred to as an orchestrator. Conductor 104 may instruct or command robot(s) or automation executor 106 to execute or monitor a workflow in a mainframe, web, virtual machine, remote machine, virtual desktop, enterprise platform, desktop app(s), browser, or the like client, application, or program. Conductor 104 may act as a central or semi-central point to instruct or command a plurality of robots to automate a computing platform.

In certain configurations, conductor 104 may be configured for provisioning, deployment, configuration, queueing, monitoring, logging, and/or providing interconnectivity. Provisioning may include creating and maintenance of connections or communication between robot(s) or automation executor 106 and conductor 104. Deployment may include assuring the delivery of package versions to assigned robots for execution. Configuration may include maintenance and delivery of robot environments and process configurations. Queueing may include providing management of queues and queue items. Monitoring may include keeping track of robot identification data and maintaining user permissions. Logging may include storing and indexing logs to a database (e.g., an SQL database) and/or another storage mechanism (e.g., ElasticSearch®, which provides the ability to store and quickly query large datasets). Conductor 104 may provide interconnectivity by acting as the centralized point of communication for third-party solutions and/or applications.

Robot(s) or automation executor 106 may be configured as unattended 108 or attended 110. For unattended 108 operations, automation may be performed without third party inputs or control. For attended 110 operation, automation may be performed by receiving input, commands, instructions, guidance, or the like from a third party component.

A robot(s) or automation executor 106 may be execution agents that run workflows built in designer 102. A commercial example of a robot(s) for UI or software automation is UiPath Robots™. In some embodiments, robot(s) or automation executor 106 may install the Microsoft Windows® Service Control Manager (SCM)-managed service by default. As a result, such robots can open interactive Windows® sessions under the local system account, and have the rights of a Windows® service.

In some embodiments, robot(s) or automation executor 106 may be installed in a user mode. These robots may have the same rights as the user under which a given robot is installed. This feature may also be available for High Density (HD) robots, which ensure full utilization of each machine at maximum performance such as in an HD environment.

In certain configurations, robot(s) or automation executor 106 may be split, distributed, or the like into several components, each being dedicated to a particular automation task or activity. Robot components may include SCM-managed robot services, user mode robot services, executors, agents, command line, or the like. SCM-managed robot services may manage or monitor Windows® sessions and act as a proxy between conductor 104 and the execution hosts (i.e., the computing systems on which robot(s) or automation executor 106 is executed). These services may be trusted with and manage the credentials for robot(s) or automation executor 106.

User mode robot services may manage and monitor Windows® sessions and act as a proxy between conductor 104 and the execution hosts. User mode robot services may be trusted with and manage the credentials for robots 130. A Windows® application may automatically be launched if the SCM-managed robot service is not installed.

Executors may run given jobs under a Windows® session (i.e., they may execute workflows). Executors may be aware of per-monitor dots per inch (DPI) settings. Agents may be Windows® Presentation Foundation (WPF) applications that display available jobs in the system tray window. Agents may be a client of the service. Agents may request to start or stop jobs and change settings. The command line may be a client of the service. The command line is a console application that can request to start jobs and waits for their output.

In configurations where components of robot(s) or automation executor 106 are split as explained above helps developers, support users, and computing systems more easily run, identify, and track execution by each component. Special behaviors may be configured per component this way, such as setting up different firewall rules for the executor and the service. An executor may be aware of DPI settings per monitor in some embodiments. As a result, workflows may be executed at any DPI, regardless of the configuration of the computing system on which they were created. Projects from designer 102 may also be independent of browser zoom level. For applications that are DPI-unaware or intentionally marked as unaware, DPI may be disabled in some embodiments.

Figure 1B:
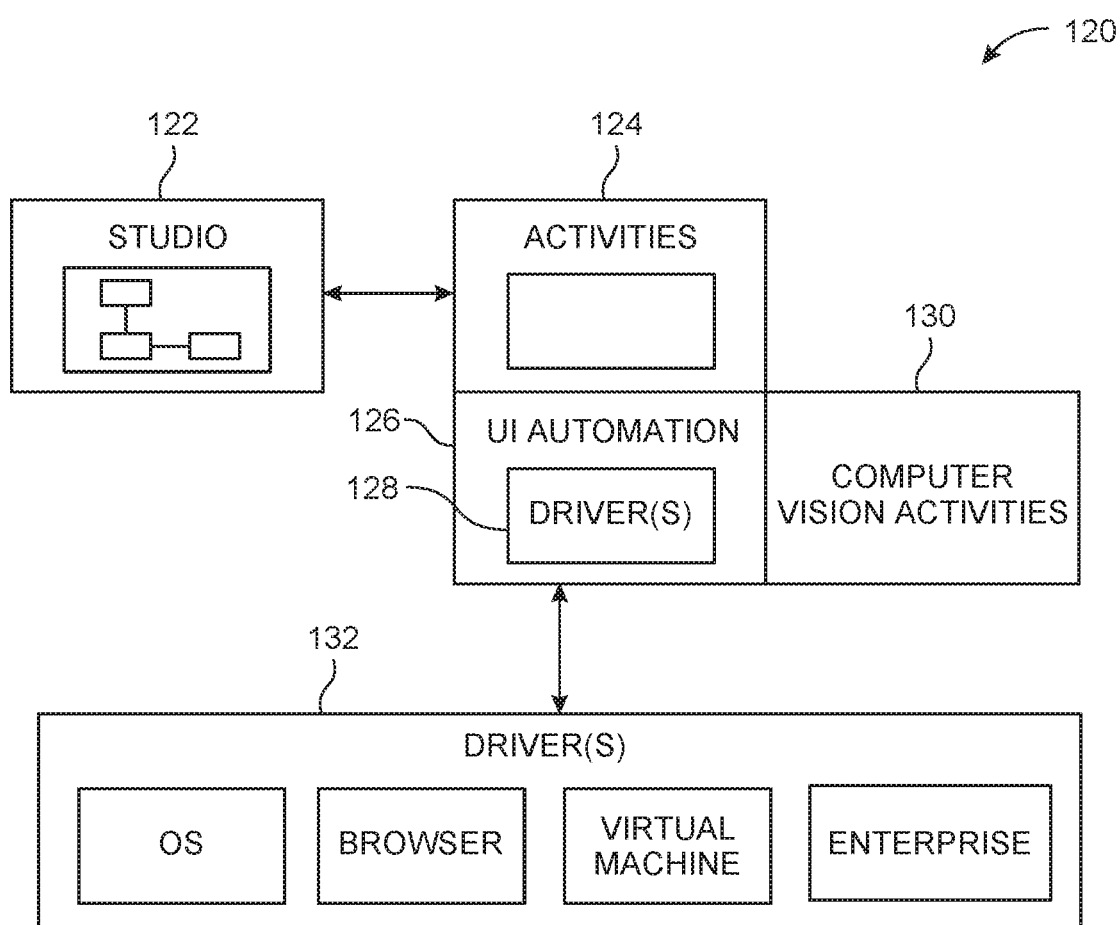
FIG. 1B is another illustration of RPA development, design, operation, or execution.
Figure 1C:
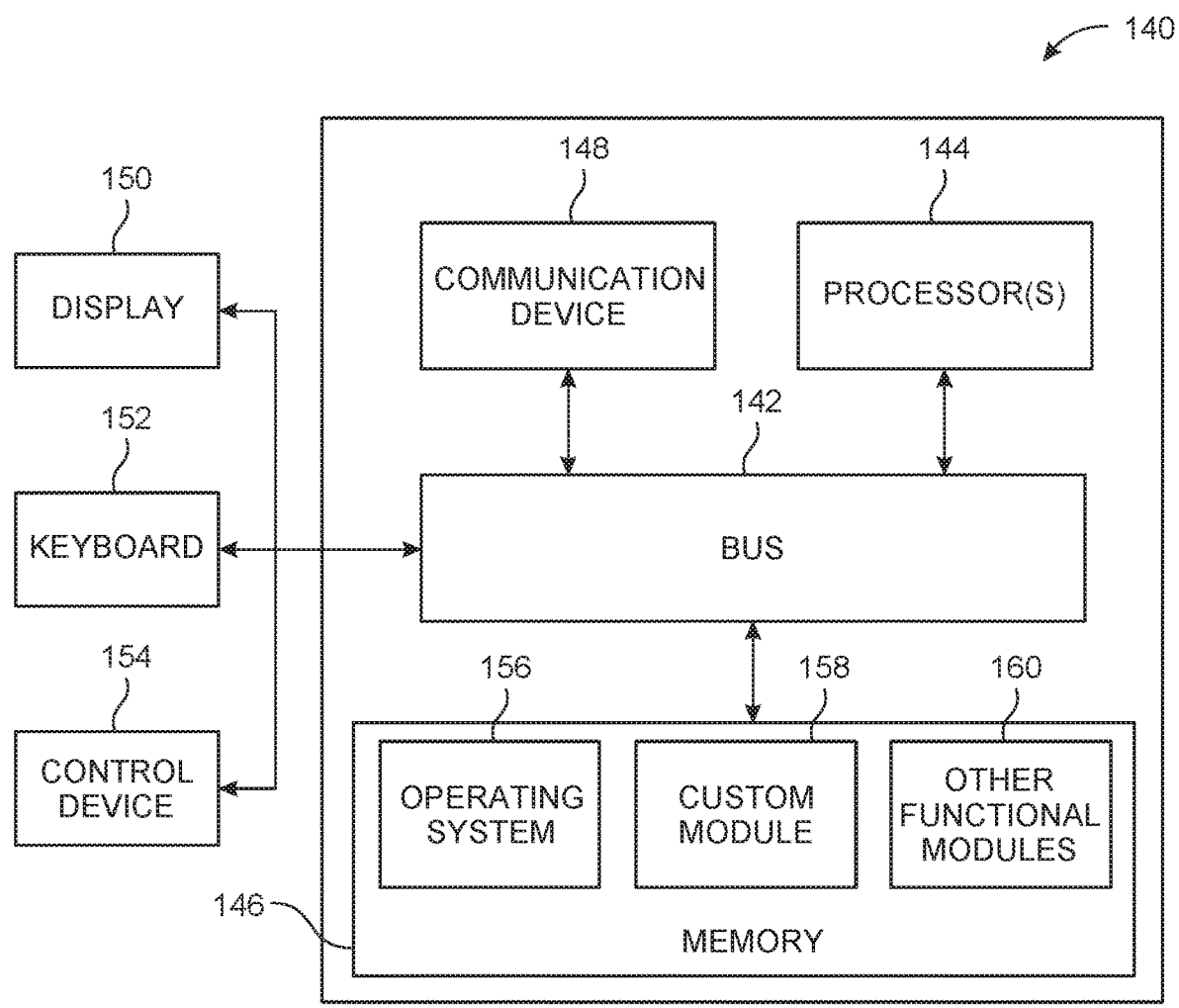
FIG. 1C is an illustration of a computing system or environment.

FIG. 1B is another illustration of RPA development, design, operation, or execution 120. A studio component or module 122 may be configured to generate code, instructions, commands, or the like for a robot to perform one or more activities 124. User interface (UI) automation 126 may be performed by a robot on a client using one or more driver(s) components 128. A robot may perform activities using computer vision (CV) activities module or engine 130. Other drivers 132 may be utilized for UI automation by a robot to get elements of a UI. They may include OS drivers, browser drivers, virtual machine drivers, enterprise drivers, or the like. In certain configurations, CV activities module or engine 130 may be a driver used for UI automation.

FIG. 10 is an illustration of a computing system or environment 140 that may include a bus 142 or other communication mechanism for communicating information or data, and one or more processor(s) 144 coupled to bus 142 for processing. One or more processor(s) 144 may be any type of general or specific purpose processor, including a central processing unit (CPU), application specific integrated circuit (ASIC), field programmable gate array (FPGA), graphics processing unit (GPU), controller, multi-core processing unit, three dimensional processor, quantum computing device, or any combination thereof. One or more processor(s) 144 may also have multiple processing cores, and at least some of the cores may be configured to perform specific functions. Multi-parallel processing may also be configured. In addition, at least one or more processor(s) 144 may be a neuromorphic circuit that includes processing elements that mimic biological neurons.

Memory 146 may be configured to store information, instructions, commands, or data to be executed or processed by processor(s) 144. Memory 146 can be comprised of any combination of random access memory (RAM), read only memory (ROM), flash memory, solid-state memory, cache, static storage such as a magnetic or optical disk, or any other types of non-transitory computer-readable media or combinations thereof. Non-transitory computer-readable media may be any media that can be accessed by processor(s) 144 and may include volatile media, non-volatile media, or the like. The media may also be removable, non-removable, or the like.

Communication device 148, may be configured as a frequency division multiple access (FDMA), single carrier FDMA (SC-FDMA), time division multiple access (TDMA), code division multiple access (CDMA), orthogonal frequency-division multiplexing (OFDM), orthogonal frequency-division multiple access (OFDMA), Global System for Mobile (GSM) communications, general packet radio service (GPRS), universal mobile telecommunications system (UMTS), cdma2000, wideband CDMA (W-CDMA), high-speed downlink packet access (HSDPA), high-speed uplink packet access (HSUPA), high-speed packet access (HSPA), long term evolution (LTE), LTE Advanced (LTE-A), 802.11x, Wi-Fi, Zigbee, Ultra-WideBand (UWB), 802.16x, 802.15, home Node-B (HnB), Bluetooth, radio frequency identification (RFID), infrared data association (IrDA), near-field communications (NFC), fifth generation (5G), new radio (NR), or any other wireless or wired device/transceiver for communication via one or more antennas. Antennas may be singular, arrayed, phased, switched, beamforming, beamsteering, or the like.

One or more processor(s) 144 may be further coupled via bus 142 to a display device 150, such as a plasma, liquid crystal display (LCD), light emitting diode (LED), field emission display (FED), organic light emitting diode (OLED), flexible OLED, flexible substrate displays, a projection display, 4K display, high definition (HD) display, a Retina© display, in-plane switching (IPS) or the like based display. Display device 150 may be configured as a touch, three dimensional (3D) touch, multi-input touch, or multi-touch display using resistive, capacitive, surface-acoustic wave (SAW) capacitive, infrared, optical imaging, dispersive signal technology, acoustic pulse recognition, frustrated total internal reflection, or the like as understood by one of ordinary skill in the art for input/output (I/O).

A keyboard 152 and a control device 154, such as a computer mouse, touchpad, or the like, may be further coupled to bus 142 for input to computing system or environment 140. In addition, input may be provided to computing system or environment 140 remotely via another computing system in communication therewith, or computing system or environment 140 may operate autonomously.

Memory 146 may store software components, modules, engines, or the like that provide functionality when executed or processed by one or more processor(s) 144. This may include an OS 156 for computing system or environment 140. Modules may further include a custom module 158 to perform application specific processes or derivatives thereof. Computing system or environment 140 may include one or more additional functional modules 160 that include additional functionality.

Computing system or environment 140 may be adapted or configured to perform as a server, an embedded computing system, a personal computer, a console, a personal digital assistant (PDA), a cell phone, a tablet computing device, a quantum computing device, cloud computing device, a mobile device, a fixed mobile device, a smart display, a wearable computer, or the like.

In the examples given herein, modules may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may be at least partially implemented in software for execution by various types of processors. An identified unit of executable code may include one or more physical or logical blocks of computer instructions that may, for instance, be organized as an object, procedure, routine, subroutine, or function. Executables of an identified module co-located or stored in different locations such that, when joined logically together, comprise the module.

A module of executable code may be a single instruction, one or more data structures, one or more data sets, a plurality of instructions, or the like distributed over several different code segments, among different programs, across several memory devices, or the like. Operational or functional data may be identified and illustrated herein within modules, and may be embodied in a suitable form and organized within any suitable type of data structure.

In the examples given herein, a computer program may be configured in hardware, software, or a hybrid implementation. The computer program may be composed of modules that are in operative communication with one another, and to pass information or instructions.

Figure 2:
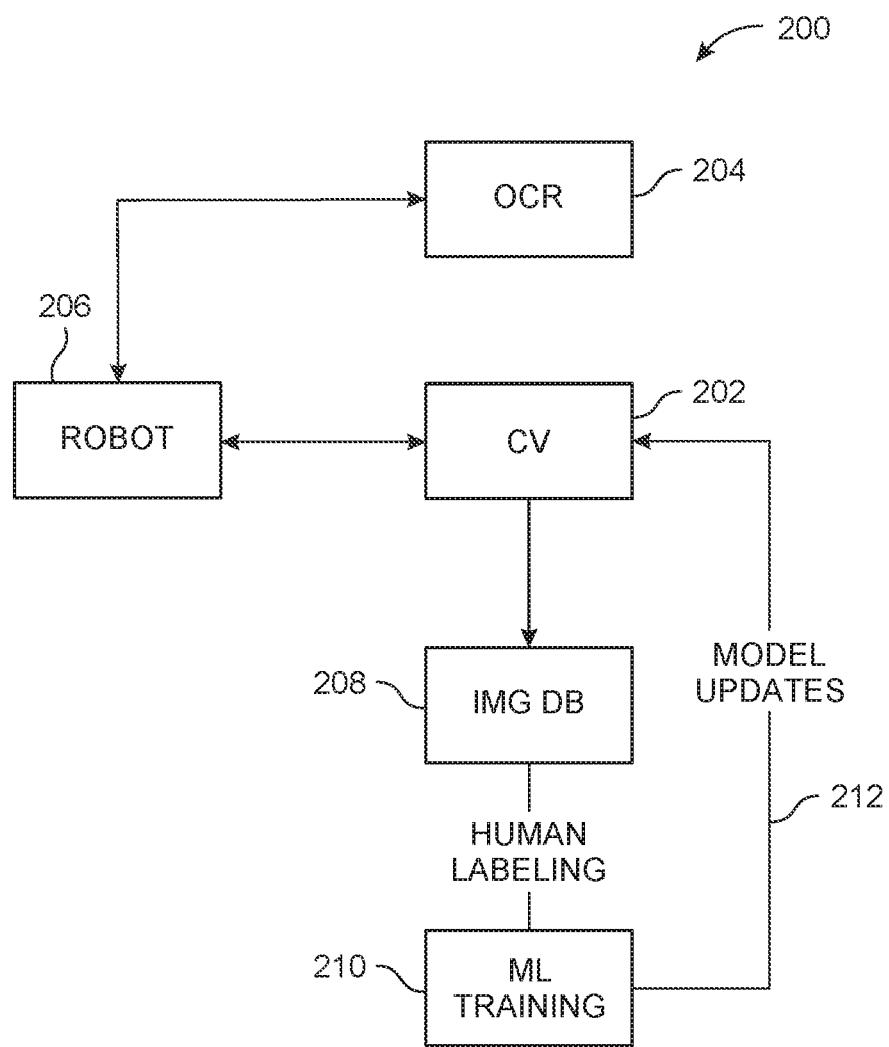
FIG. 2 is an illustration of retraining using a feedback loop for RPA.

FIG. 2 is an illustration of retraining using a feedback loop for RPA. CV module, engine, or component 202 and optical character recognition (OCR) module or engine 204 may receive from robot 206 elements, buttons, checkboxes, found in a captured image, along with corresponding coordinates and type information. A captured image may be a screenshot of targeted visual and text portions of a UI on a client made during development, runtime, or the like for automation. The images may be part or a portion of a window, document, report, receipt, invoice, application, or the like. Images may include either structured or unstructured data. An image of a UI may include a Graphical User Interface (GUI) of an application to be automated.

Robot 206 may identify two or more anchors points, reference points, or the like of a target or element in an image of a UI to CV module, engine, or component 202. In certain configurations, a first anchor may be automatically chosen and if an element in a target area is not unique, user input may be requested for one or more additional discriminator anchors. As an example, two or more anchor points may assist in determining a relationship between edit boxes and checkboxes. In certain configurations, the relationship may prevent CV module, engine, or component 202 from misidentifying a checkbox as an edit box or radio button and discarding it in error, such as due to element size or format in a ML model.

Robot 206 may also send captured images or screenshots of a target area to an OCR module or engine 204 to detect text or text fields, as understood by one of ordinary skill in the art, for assistance with determining relationships of a captured UI image or screen. A text field may comprise one or more text tokens. A text token may comprise one or more characters found between a set of pre-determined delimiters such as white space, punctuation characters, special characters, or the like. Text tokens may also include a number, a date, an email address, a uniform resource identifier (URI), a zip code, or the like.

In multi-anchoring of a UI for RPA 200, one or more anchor or reference points in a UI image may be utilized to pair or create geometric, positional, locational, coordinate based, or the like associations or relationships for element identification, visualization, development, generation, production, regeneration, training, retraining, or the like. In certain configurations, multi-anchoring may be utilized by RPA systems as an additional or second layer of error checking to primary capture of a UI.

Labels and text fields defined as anchors in a UI for automation may be connected by or form a relationship. In an example, a text field may be a target and the label an anchor. As an example, a relationship may be to the left of an element in a UI there is a first name field and label that is anchored and on top of the first name field is a second name field that is anchored. During RPA development, a set of anchors may be defined for one or more elements needed for an activity or workflow. In certain configurations, together with the target element, the element and anchors may operate as a logical fingerprint that can be used to identify the same element at subsequent executions for automation, such as during runtime.

Figure 3:
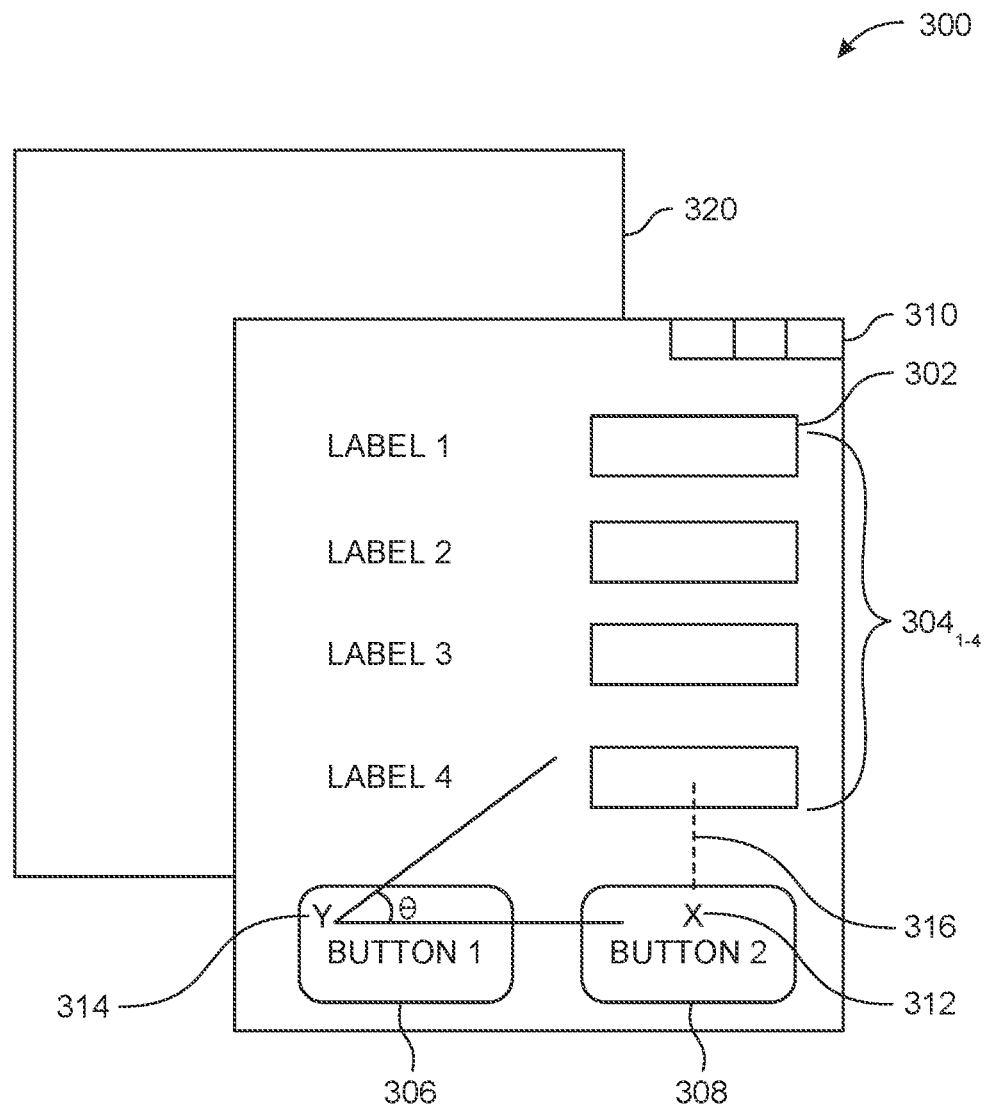
FIG. 3 is an illustration of multi-anchoring of a user interface (UI) for RPA.

FIG. 3 is another illustration of multi-anchoring of a UI for RPA 300. As an example, a window or application 302 in a UI may comprise labels 1-4 for fields $304_{1-4}$, Button 1 (306), Button 2 (308), and minimize/maximize/close controls 310. Window or application 302 may be oriented or positioned substantially in front of window or application 320. In certain configurations, the multi-anchoring of a UI for RPA 300 may represent a virtual machine environment, remote desktop, or the like. However, the multi-anchoring of a UI for RPA 300 may represent other computing environments or applications, as understood by one of ordinary skill in the art. For instance, multi-anchor configurations may be applied to activities involving portable document formats (PDFs), Silverlight, Flash, or the like.

An anchor X (312) may comprise coordinates (x, y, width, and height) in relation to dimensions of Button 2 (308). In certain configurations, coordinates may be screen coordinates saved of the elements in an area of a UI and during runtime, relative relationships may be inferred between all elements automatically by robot 206. In addition, use of relative relationships during runtime may be performed with or without CV module, engine, or component 202.

In certain configurations, coordinates (x, y, width, and height) may define a bounding box. Parameters x and y may be coordinates of a vertex and w and h may be a width and a height. Relationships between a target and anchors may be elastic within a tolerance or threshold for changes or variances in scale, DPI, or the like in the UI or application area. Changes or variances may be undesirable or problematic since for image-matching or selector-based configurations, a robot using CV may need an identical structure to locate the elements identified during development to automate a workflow or activity. If an application is different from that during automation development, the robot or workflow may crash during runtime.

Elasticity may be particularly desirable for applications that have a dynamic or "fluid" layout, such as web pages that reflow content based on window size. Elasticity may also be beneficial for a video stream or output of a virtual machine, remote machine, or virtual desktop environment. In certain configurations, it may be desirable for geometric anchor or reference coordinates or angles to be inelastic.

Anchor Y (314) may be utilized for element detection in a window or application 302 by measuring a geometric angular (θ) relationship 1 between Button 1 (306) and field $304_4$. Multi-anchoring through anchor X (312) and anchor Y (314) may prevent robot or workflow crashes during runtime if elements in window or application 302 are substantially different or vary from that during automation development. This may be achieved using multiple anchors by robot 206 and/or CV module, engine, or component 202 to uniquely identify a screen element, based on its relationship to other screen elements, its position in the interface, relevant text labels, or the like.

Anchor X (312) may be utilized to determine a distance 316 relationship 2 between Button 2 (308) and field $304_4$. Distance 316 between Button 2 (308) and field $304_4$ may be relative or absolute. Relationship 1 and 2 may be utilized by CV module, engine, or component 202 with OCR results for robot generation or regeneration during runtime execution of a workflow, activities, or the like. As explained herein, the results for substantially all or a subset of detected elements may also be provided with confidence levels for each element to robot 206 to reduce errors and increase performance for automation.

Relationship 1 or 2 may also be utilized to update image database 208 to update models by ML training module, engine, or component 210 for training or retraining. In addition to Relationship 1 and 2, a text field may be an anchor or reference for a box to form a relationship with an edit box for unique identification by a robot. In configurations with two name label fields, two anchors may be utilized for one text box.

Figure 4:
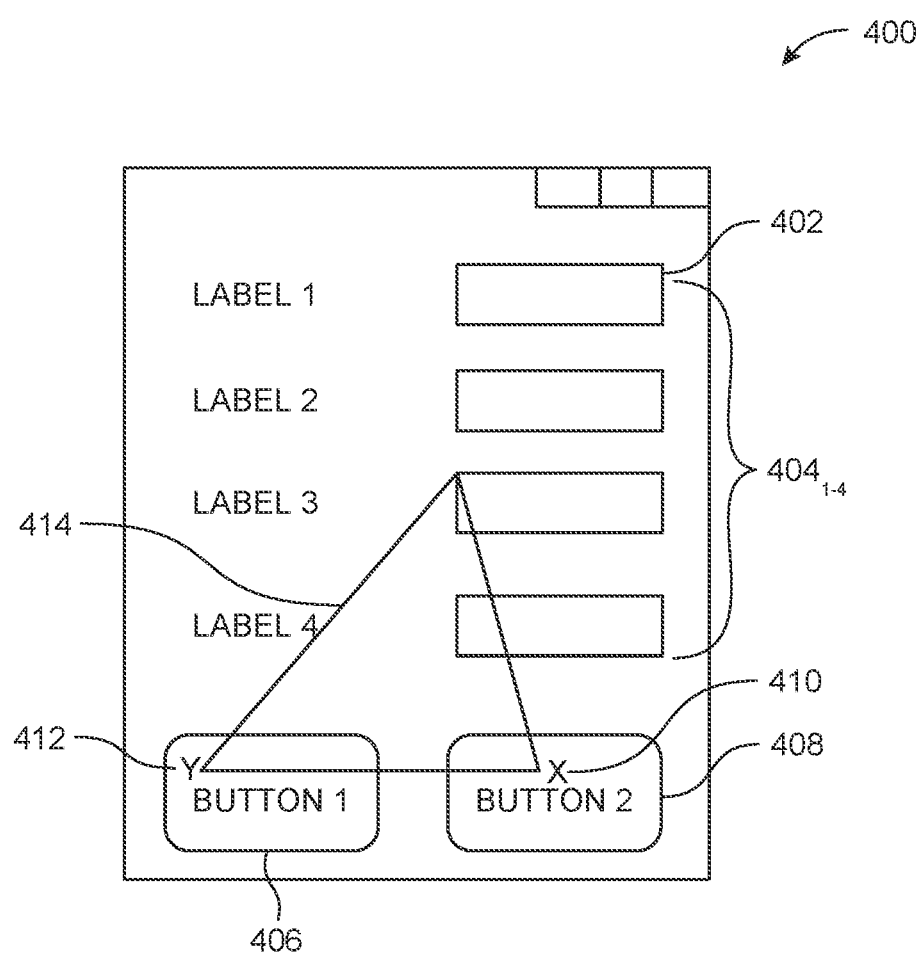
FIG. 4 is another illustration of multi-anchoring of a UI for RPA.

FIG. 4 is another illustration of multi-anchoring of a UI for RPA 400. As an example, a window or application 402 in a UI may comprise labels 1-4 for fields $404_{1-4}$, Button 1 (406) and Button 2 (408). An anchor X (410) may comprise coordinates (x, y, width, and height) in relation to dimensions of a Button 2 (408) and be elastic for changes in scale, DPI, or the like in the UI. Parameters x and y may be coordinates of a vertex and w and h may be a width and a height, for instance, of Button 1 (406) or Button 2 (408). In certain configurations, it may be desirable for geometric anchor or reference coordinates or angles to be elastic or inelastic, as explained herein.

Anchor Y (412) and anchor X (410) may be utilized for element detection in a window or application 402 in a UI by forming a triangular relationship between Button 1 (406), field $404_3$, and field $404_4$. The triangular relationship may be achieved or performed by determining angular, positional, or distance-based geometries of Button 1 (406), field $404_3$, and field $404_4$. The triangular relationship may be determined or utilized by CV module, engine, or component 202 to be used with OCR results for robot generation or regeneration during runtime or execution of a workflow, activities, or the like.

Figure 4A:
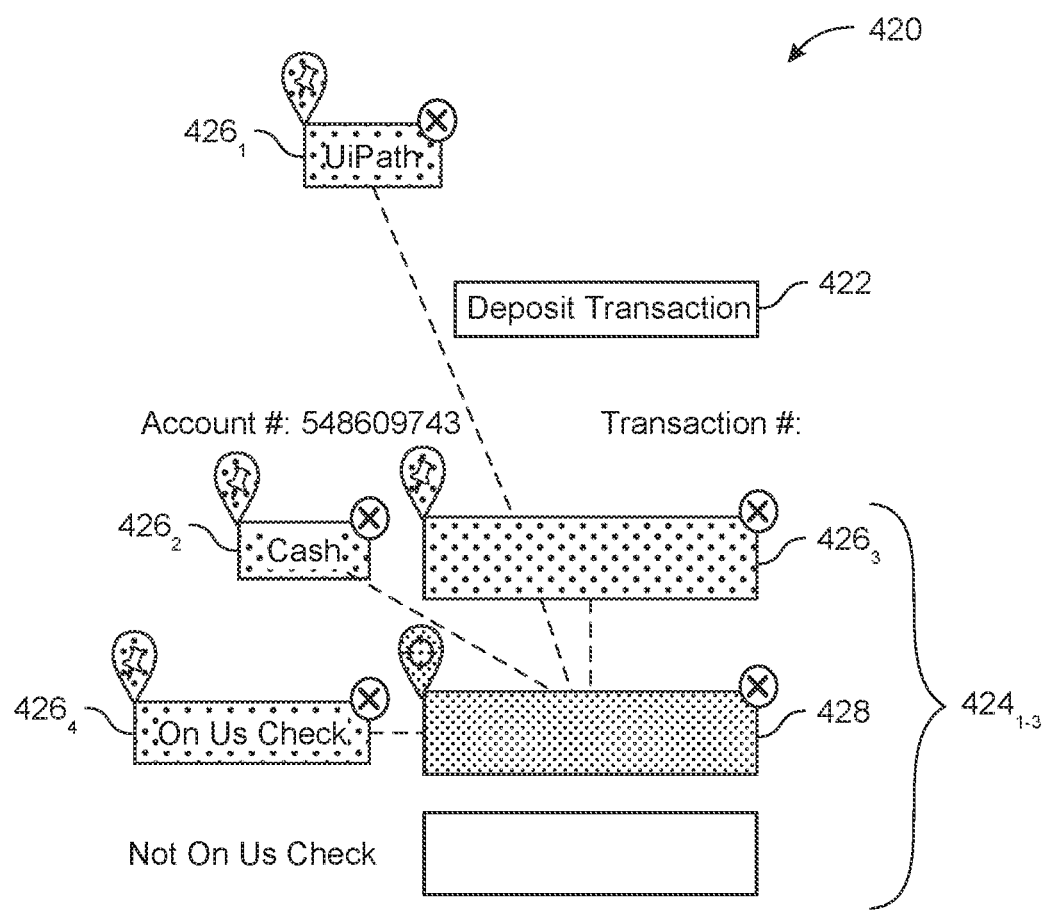
FIG. 4A is another illustration of multi-anchoring of a UI for RPA.

FIG. 4A is another illustration of multi-anchoring of a UI for RPA 420. In an application with a deposit transaction 422 of a captured UI, multiple anchors $426_1$-$426_4$ may be configured to create a relationship 428 for identifying element $424_2$. Relationship 428 may be determined based on geometries formed or distances calculated to element $424_2$ based on multiple anchors $426_1$-$426_4$. In certain configurations, relationship 428 may be utilized to differentiate element $424_2$ from elements $424_1$ and $424_3$ during automation production, runtime, execution, or the like. In certain configurations, anchors may be set at the client or utilized at the client while CV module, engine, or component 202 determines relationship 428.

In other configurations of multi-anchoring, a relationship may be formed using other shapes such as squares, rectangles, any N-sided polygon, or any other desired shape using the analysis explained herein for the triangular relationship. A N-sided polygon may be formed such that angles between each element are elastic and the N-sided polygon formed by the edges connecting all anchors may be scaled. In certain configurations, a text field may be an anchor or reference for a box to form a relationship with an edit box for identification by a robot. In addition, any relationship may act as a fingerprint, impression, template, or the like to find or identify an element during runtime or execution.

Referring again to FIG. 2, CV module, engine, or component 202 may process the returned results, including anchor or reference point information, geometries, or the like and provide data or information of substantially all or a subset of detected elements to an image database 208. Image database 208 may be utilized by a server, studio component, design component, or the like to label or classify a captured image or a subset of elements in an image(s) and provide it to ML training module, engine, or component 210 for unique identification and modeling, training, retraining, deep learning, neural network operation, or the like. Model updates 212 may be provided to CV module, engine, or component 202 for analysis for design or runtime operation to reduce duplication, errors, reduce false positives, or increase RPA automation performance.

Fuzzy matching or logic may be utilized in multi-anchoring for RPA 200 to compensate for errors by OCR engines, such as Google™ cloud OCR, Microsoft™ OCR, Tessoract OCR™, or the like of text fields, text, or the like. An image or part of an image may be sent to OCR module or engine 204 and CV module, engine, or component 202 and feedback sent to robot 206 with detected types or elements for regeneration of a UI view. As an example, with fuzzy matching, labels 1-4 may each be assigned to a list of names. With fuzzy matching, detecting "NAM" or "NME" may be logically associated or matched with "NAME." Similarly, in FIG. 3 fields $304_{1-4}$ may each be assigned to a list of edit boxes. The list of possible elements may be provided by CV module, engine, or component 202 to robot 206 to establish relationships.

In the examples given herein, geometric matching with thresholding, such as for relative distance associated with an anchor, may be utilized for RPA of a UI. As an example, each element in an image of a UI may be related with a confidence, threshold, matching threshold, tolerance, or the like. Possible matches of an element below the threshold may be discarded for matching or the like. With multiple anchors, a possible relationship fit for elements may utilize a confidence interval (CI) such that false positives of one or more elements are reduced.

As an example, detected elements below a CI of 50%, 60%, 98%, or any parameter, may be discarded. CI, confidence thresholds, tolerance thresholds, or the like may be based on ML or deep learning models that may be trained or retrained. Different CI, confidence thresholds, tolerance thresholds, or the like levels or ranges may be utilized for matching elements in a UI during development or runtime of a robot or a plurality of robots by an orchestrator.

For a robot that may need to choose between two elements that both meet a matching threshold, a list of elements, types, or confidences with multi-anchoring may be utilized. In certain configurations with multiple matches, multiple anchors in a UI may act a stencil or shape to uniquely identify an element during analysis. In certain configurations with multi-anchoring, selected UI elements with the highest confidence may be shown in CV results during design or development of a workflow whereas during runtime all possibilities of elements in a UI may be checked by a CV for workflow execution by a robot.

In the examples given herein, geometrics of multiple anchors may snap horizontally or vertically with a smaller tolerance for geometric thresholding. Anchors that snap horizontally or vertically with another element may be treated differently. For instance, a smaller tolerance may be allowed for how far a direction can move perpendicular to a snapping axis. If a button is used as an anchor for a text field, text, label, or the like element, runtime may be layered such that when a connection is made to the element, other lower probability elements may be connected at the respective location or coordinates.

Figure 5:
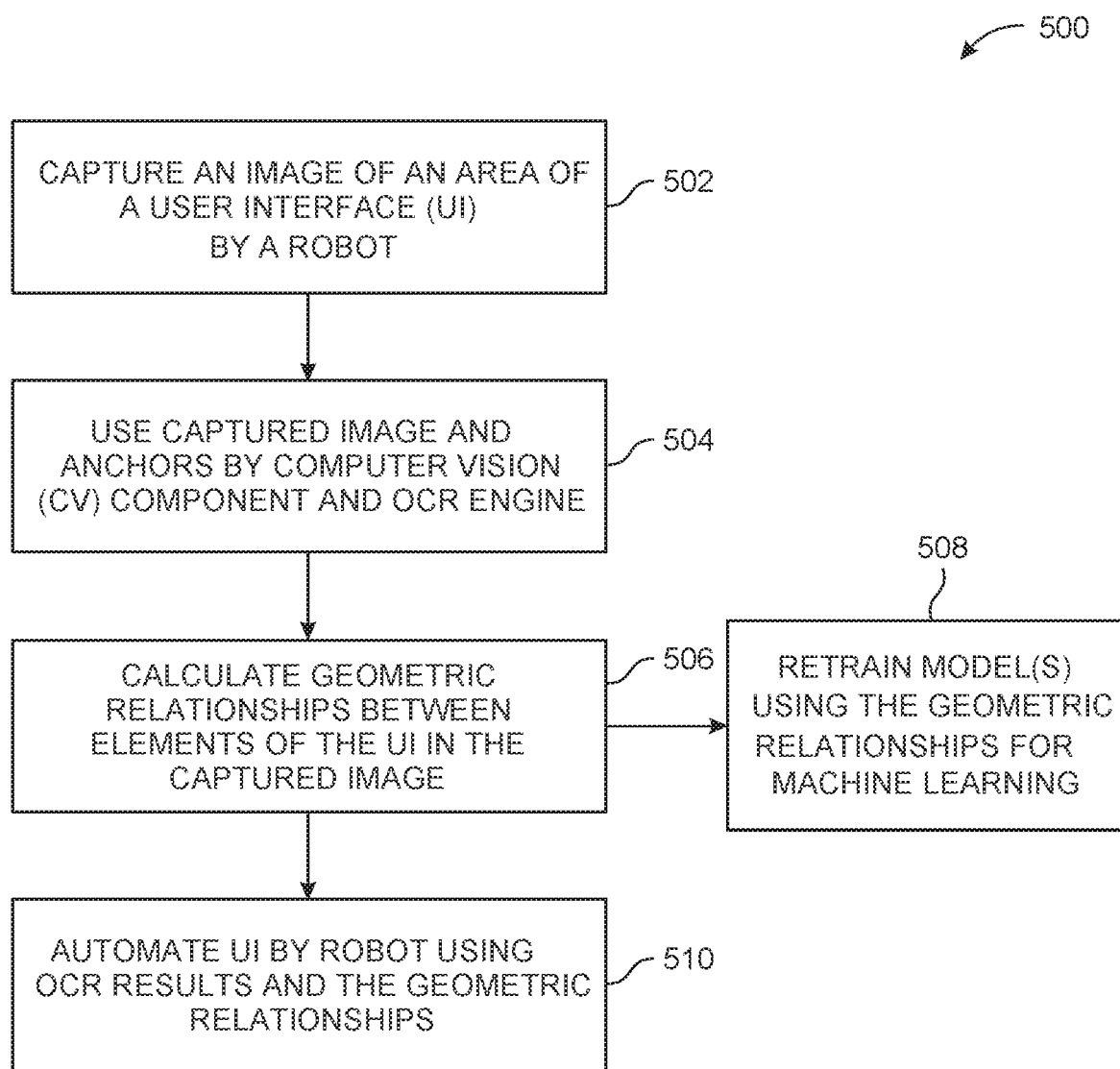
FIG. 5 is an illustration of a process using multi-anchoring of a UI for RPA.

FIG. 5 is an illustration of a process using multi-anchoring of a UI for RPA 500. In FIG. 5, operations may be performed out of order and substeps not shown may also be performed. An image of an area of a UI may be captured by a robot for RPA (502). After analysis and display of the image, the captured image and anchors may be used by a CV component and OCR engine (504). In certain configurations, the system may receive an input of a selected element and one or more anchors that is stored in a workflow. Geometric relationships between elements, including anchors, of the UI in the captured image may be calculated (506). If the selected element is not identified, as explained herein selection using bounding-boxes may be used for element detection and models may be retrained using the geometric relationships for ML (508). A UI by a RPA robot may be regenerated using OCR results and the geometric relationships (510) for workflow or activity execution.

Referring again to ML, results of a CV model may include, for every image captured, analyzed, scraped, or stored, a list of possibilities for one or more elements in the image and associated ML-determined probabilities to increase accuracy, prevent false positives, increase automation performance, or the like. This may be performed by CV module, engine, or component 202 sending an image database 208 for machine training or retraining by ML training module, engine, or component 210.

A user may intervene when an element in a UI is improperly identified by drawing a bounding box around a target area. The captured image may be stored in an automation file for searching during runtime. Additionally, in certain configurations the captured image may be utilized for retraining a CV model since user intervention may indicate or signal that a model missed an element.

In addition, if CV module, engine, or component 202 detects a subset of missing buttons or elements, a missing element report may be automatically sent to image database 208 for machine training or retraining by ML training module, engine, or component 210. An element may be missing because a ML model failed to identify it. This operation may transparent to robot 206.

For element identification, a list of possible elements may include similar and alternative elements. Each possible result may also be associated with a statistical CI that may be associated with a ML or deep learning model. This may be performed during a selection of an object in a UI or without any selection. If an element is misidentified, such as due to a click, user input, image distortion, or the like, a multi-anchor algorithm may utilize one or more anchors to make a correct determination of an intended target element. For example, anchor X and anchor Y may be utilized to search for all the elements that are check boxes even if the ML engine believes at least one element is a radio button.

When an element is misidentified, other elements may be used as anchors for analysis. For instance, a radio button may be misidentified as a checkbox as the most probable match. In ranked list with probabilities, the second or third most likely match may be the actual or correct match. The addition of another anchor, such as another nearby radio button, may help to identify which element a given component is from the list of probabilities.

As another example of operations given herein for an autonomous vehicle computing context, while detecting objects on the road using CV, a criterion or rule may be established such that "if a bicycle does not have a human on it, it is not a bicycle" to prevent misidentification of objects as a bicycle. The target object may be a bicycle and the human and road may be anchors or reference points. In a similar UI context, a field may be a target and a button and field label anchors.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A computing device that automates an activity in a virtual or remote machine environment, the computing device comprising:
    a transceiver; and
    a processor communicatively coupled the transceiver, wherein the processor is configured to acquire a captured image of a window of a user interface (UI), wherein the captured image includes two or more anchors that are each respective fields in the window, transmit the captured image to a computer vision (CV) engine and to an optical character recognition (OCR) engine, and perform the activity on the target element in the UI based on based on a triangular relationship between the two or more anchors and a target element in an area of the captured image received from the OCR engine and the CV engine.

2. The computing device of claim 1, wherein:
    the two or more anchors include an anchored button, and
    the triangular relationship is defined by a relationship between the anchored button the target element.

3. The computing device of claim 1, wherein the captured image is from a video stream of the virtual or remote machine environment.

4. The computing device of claim 1, wherein the triangular relationship comprises an angle.

5. The computing device of claim 1, wherein the triangular relationship is determined using a ML model.

6. The computing device of claim 1, wherein retraining is performed based on a missing element detected in the captured image of the UI.

7. The computing device of claim 1, wherein the triangular relationship is based on elastic or inelastic geometric features contained in the captured image of the UI.

8. The computing device of claim 1, wherein a first anchor of the two or more anchors is positioned on a first button and a second anchor of the two or more anchors is positioned on a second button.

9. A method for automating an activity in a virtual or remote machine environment, the method comprising:
    acquiring, by a processor, a captured image of a window of a user interface (UI), wherein the captured image includes two or more anchors that are each respective fields in the window and transmitting the capture image to a computer vision (CV) engine and an optical character recognition (OCR) engine; and
    performing, by the processor, the activity on the target element in the UI based on a triangular relationship between the two or more anchors and a target element in an area of the captured image received from the OCR engine and the CV engine.

10. The method of claim 9, wherein the two or more anchors include an anchored button, and
    the triangular relationship is defined by a relationship between the anchored button and the target element.

11. The method of claim 9, wherein the captured image is from a video stream of the virtual or remote machine environment.

12. The method of claim 9, wherein the triangular relationship comprises an angle or geometric relationship.

13. The method of claim 9, wherein the triangular relationship is determined using a ML model.

14. The method of claim 9, wherein retraining is performed based on a missing element detected in the captured image of the UI.

15. The method of claim 9, wherein the triangular relationship is based on elastic or inelastic geometric features contained in the captured image of the UI.

16. The method of claim 9, wherein a first anchor of the two or more anchors is positioned on a first button and a second anchor of the two or more anchors is positioned on a second button.

* * * * *